(12) United States Patent
Alriksson

(10) Patent No.: US 8,908,665 B2
(45) Date of Patent: Dec. 9, 2014

(54) METHODS FOR ROUTING OF CALLS IN INTERNET PROTOCOL MULTIMEDIA SUBSYSTEM CENTRALIZED SERVICES NETWORKS AND RELATED GATEWAY MOBILE SWITCHING CENTRES (GMSC) AND HOME LOCATION REGISTERS (HLR)

(75) Inventor: Fredrik Alriksson, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 730 days.

(21) Appl. No.: 13/158,649

(22) Filed: Jun. 13, 2011

(65) Prior Publication Data

US 2012/0307813 A1 Dec. 6, 2012

(30) Foreign Application Priority Data

Jun. 1, 2011 (WO) ................. PCT/EP2011/059064

(51) Int. Cl.
*H04W 4/00* (2009.01)
*H04L 12/66* (2006.01)
*H04W 40/00* (2009.01)
*H04L 29/06* (2006.01)
*H04W 8/08* (2009.01)

(52) U.S. Cl.
CPC ............ *H04L 65/1016* (2013.01); *H04W 8/08* (2013.01); *H04L 65/104* (2013.01); *H04L 65/1069* (2013.01); *H04L 65/103* (2013.01)
USPC ........... 370/338; 370/328; 370/352; 370/356; 455/444; 455/448; 455/466

(58) Field of Classification Search
CPC ... H04W 36/0022; H04W 80/10; H04W 8/08; H04L 65/4007; H04L 65/1066; H04L 65/1016; H04L 65/104; H04L 65/103; H04L 65/1069

USPC .................................................... 370/228–356
See application file for complete search history.

(56) References Cited

U.S. PATENT DOCUMENTS

| | | | | |
|---|---|---|---|---|
| 7,609,700 | B1 * | 10/2009 | Ying et al. | 370/395.21 |
| 7,990,912 | B2 * | 8/2011 | Nix et al. | 370/328 |
| 8,036,210 | B2 * | 10/2011 | Zhu et al. | 370/352 |
| 8,213,363 | B2 * | 7/2012 | Ying et al. | 370/328 |

(Continued)

OTHER PUBLICATIONS

Notification of Transmittal of the International Search Report and the Written Opinion of the International Searching Authority, or the Declaration, PCT/EP2011/059064, Feb. 16, 2012, 10 pages.

(Continued)

*Primary Examiner* — Venkatesh Haliyur
(74) *Attorney, Agent, or Firm* — Myers Bigel Sibley & Sajovec

(57) ABSTRACT

Methods for routing a call involving an Internet Protocol (IP) Multimedia Subsystem Centralized Services (ICS) subscriber accessing an IP Multimedia Subsystem (IMS) network using a circuit switched (CS) access network are provided. The method includes receiving an incoming call request for a user at a gateway Mobile Switching Centre (GMSC); accessing a Location Register storing information relating to the user to determine if the user is an ICS subscriber; and generating and forwarding a SIP INVITE message to the IMS to establish the call if it is determined that the user is an ICS subscriber. Related Gateway Mobile Switching Centres (GMSCs) and Home Location Registers (HLR) are also provided herein.

18 Claims, 3 Drawing Sheets

(56) References Cited

U.S. PATENT DOCUMENTS

| | | | |
|---|---|---|---|
| 8,249,588 B2* | 8/2012 | Cheng | 455/432.3 |
| 8,670,760 B2* | 3/2014 | Lawler et al. | 455/426.2 |
| 8,743,868 B2* | 6/2014 | Witzel et al. | 370/352 |
| 2007/0032251 A1* | 2/2007 | Shaheen | 455/466 |
| 2008/0117893 A1* | 5/2008 | Witzel et al. | 370/352 |
| 2008/0205381 A1* | 8/2008 | Zhu et al. | 370/352 |
| 2008/0244148 A1* | 10/2008 | Nix et al. | 710/313 |
| 2010/0017521 A1* | 1/2010 | Ying et al. | 709/227 |
| 2010/0144351 A1* | 6/2010 | Witzel et al. | 455/435.2 |
| 2010/0234018 A1* | 9/2010 | Lawler et al. | 455/426.1 |
| 2012/0307813 A1* | 12/2012 | Alriksson | 370/338 |
| 2013/0196640 A1* | 8/2013 | Wang et al. | 455/414.1 |
| 2013/0343279 A1* | 12/2013 | Keller et al. | 370/328 |

OTHER PUBLICATIONS $3^{rd}$ Generation Partnership Project; Technical Specification Group Services and System Aspects; IP Multimedia Subsystem (IMS) centralized services; Stage 2 (Release 10), Mar. 2011, 110 pages.

Written Opinion of the International Preliminary Examining Authority, PCT/EP2011/059064, May 3, 2013, 5 pages.

Notification of Transmittal of the International Preliminary Report on Patentability, PCT/EP2011/059064, Aug. 22, 2013, 12 pages.

* cited by examiner

METHODS FOR ROUTING OF CALLS IN INTERNET PROTOCOL MULTIMEDIA SUBSYSTEM CENTRALIZED SERVICES NETWORKS AND RELATED GATEWAY MOBILE SWITCHING CENTRES (GMSC) AND HOME LOCATION REGISTERS (HLR)

RELATED APPLICATION

This application claims priority to PCT Application No. PCT/EP2011/059064, filed Jun. 1, 2011, the disclosure of which is hereby incorporated herein by reference as if set forth in its entirety.

FIELD

The invention relates to the field of communications networks, and in particular to the routing of call/sessions using IP Multimedia Subsystem Centralized Services networks.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. The IMS is defined in the 3GPP Specification 23.228.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS 3 fits into the mobile network architecture in the case of a GPRS/PS access network. Although numerous network entities, or nodes are depicted, only those relevant to the present discussion have been assigned reference numerals. As shown in FIG. 1 control of communications occurs at three layers (or planes). The lowest layer is the Connectivity Layer 1, also referred to as the bearer, or traffic plane and through which signals are directed to/from user terminals accessing the network. Access to the IMS 3 by IMS subscribers is performed through an IP-Connectivity Access Network (IP-CAN). In FIG. 1 the IP-CAN is a GPRS network including entities linking the user equipment to the IMS 3 via the connectivity layer 1. The GPRS network includes various GPRS Support Nodes (GSNs).

The IMS 3 includes a core network 3a, which operates over the Control Layer 4 and the Connectivity Layer 1, and a Service Network 3b. The IMS core network 3a includes various network nodes that include Call/Session Control Functions (CSCFs) 5. The CSCFs 5 include Serving CSCFs (S-CSCF) and Proxy CSCFs (P-CSCF), which operate as SIP proxies within the IMS in the middle, Control Layer 4. Other IMS core network entities shown include a Media Resource Function Controller (MRFC), a Border Gateway Control Function BGCF and a Media Gateway Control Function, (MGCF) 5a. The IMS also includes a Home Subscriber Server (HSS) 6, which supports the IMS nodes that handle calls and performs authentication and authorization of the user. The HSS 6 may include or share access of data from a Home Location Register (HLR—not shown), which is a master user database that contains subscription-related information (subscriber profiles).

At the top is the Application Layer 7, which includes the IMS service network 3b. Application Servers (ASs) 7a are provided for implementing IMS service functionality. Application Servers 7a provide services to end-users on a session-by-session basis, and may be connected as an end-point to a single user, or "linked in" to a session between two or more users. Certain Application Servers 7a will perform actions dependent upon subscriber identities (either the called or calling subscriber, whichever is "owned" by the network controlling the Application Server 7a).

The IMS relies on Internet Protocol (IP) as a transport technology. Using IP for voice communications, however, presents some challenges, especially in the mobile community where Voice Over IP (VoIP) enabled packet switched (PS) bearers may not always be available. To allow operators to start offering IMS-based services while voice enabled PS-bearers are being built out, the industry has developed solutions that use existing Circuit Switched (CS) networks to access IMS services. These solutions are referred to as IMS Centralized Services (ICS). ICS is described in 3GPP TS 23.292 (with further aspects described in 3GPP TS 24.292 and 3GPP TS 29.292) and is also the name of the Work Item in 3GPP Release 8 addressing these matters. ICS allows a User Equipment (UE) to connect to a CS access network and to have access to Multimedia Telephony services. ICS allows for the delivery of consistent IMS services to the user regardless of the attached access type (e.g. CS domain access or IP-CAN).

FIG. 1 also shows a Circuit Switched (CS) domain 8. A call from a User Equipment (UE) is routed by a Mobile Switching Centre (MSC) 8a. The MSC where a subscriber is currently located is referred to as the visited MSC (V-MSC), while the Gateway MSC (G-MSC) 8b is the MSC that determines which MSC is the V-MSC that currently serves the subscriber who is being called. The V-MSC has an associated Visitor Location Register (VLR) which is a database of subscriber data for the subscribers currently being served by the V-MSC.

Referring to FIG. 2, where the equivalent entities have the same reference numerals as FIG. 1, an ICS-enabled UE 9 can access an MSC Server 8a via a CS Access network 10. It also accesses a CSCF 5 via a Gm reference point, and a Service Centralization and Continuity Application Server (SCC AS) 11 via a Gm reference point. SIP is used to perform service control between the ICS UE 9 and the SCC AS 11 over the Gm interface. For a speech service, the ICS UE 9 can use its CS access to transfer voice media. The ICS procedures include mechanisms whereby the MSC Server 9 is enhanced for ICS so that it can communicate directly with the IMS (e.g. CSCF 5) via the 12 interface. This is used, for example, for call origination, call termination and registration.

The SCC AS 11 is a home network based IMS Application Server that provides the functionality required to enable IMS Centralized Services. The SCC AS 11 is inserted in the session path using originating and terminating initial Filter Criteria (iFC); it is configured as the first AS in the originating iFC chain and as the last AS in the terminating iFC chain The SCC AS 11 may also be invoked through the use of Public Service Identifier (PSI) termination procedures when using CS access.

An incoming call for an ICS subscriber with a service provided by the IMS can be received either through the CS domain or via the IMS. Some, or all calls for an ICS subscriber that are received through the CS domain need to be routed to the IMS for service execution, prior to onward routing of the call to the subscriber. This is sometimes referred to as Terminating Service Domain Selection (T-SDS), or more informally to establish a terminating leg. Although the 3GPP ICS specifications do not stipulate any specific procedures, an informative annex in 3GPP TS 23.292 release 10 (Annex F.2) includes a number of procedures based on techniques available in the current CS networks. The following 5 procedures (reproduced in italics below) have been extracted from that annex. However, each of the 5 procedures has drawbacks, as explained after each one below.

1. Use of CAMEL for Call Diversion to IMS

*This option applies to configurations requiring handling of incoming calls at the GMSC function. Upon receipt of an incoming call, the GMSC queries the HSS for routing information via the Send Routing Information (SRI) query. The user profile in the HSS is configured to return T-CSI including a gsmSCF address to the GMSC in response to the SRI query. When handling calls for a subscriber with a service provided by the IMS, the subsequent processing at the gsmSCF and the GMSC results in routing of the call to the IMS using the IMRN. The call is routed to the SCC AS according to standard IMS routing procedures. In order to determine the necessary information to complete the call, the SCC AS uses the IMRN or the ISUP information mapped to SIP headers.*

CAMEL is short for Customised Applications for Mobile networks Enhanced Logic (see ETSI TS 123 078). In the extract above T-CSI is short for Terminating CAMEL Subscription Information; gsmSCF is short for GSM Service Control Function; IMRN is an IP Multimedia Routing Number; and ISUP is short for ISDN User Part. Use of CAMEL for call diversion to IMS, requires provisioning of CAMEL trigger information in subscriber data as well as configuration of associated routing data. It also involves an overhead in the form of additional call signalling of a CAMEL trigger invocation and (as described in the Annex) a PSI-routed leg within IMS from the MGCF 5a (see FIG. 1) to the SCC AS 11.

2. HSS Directed Call Diversion to IMS

*This option also applies to configurations requiring handling of incoming calls at the GMSC function. Upon receipt of an incoming call, the GMSC queries the HSS for routing information using the MAP Send Routing Information (SRI) procedure (as defined in TS 29.002). Based on a non-standardized mechanism, the user profile in the HSS is configured to return an IP Multimedia Routing Number (IMRN) to the GMSC in response to the SRI query, when the call is directed to a subscriber with a service provided by the IMS. The subsequent processing at the GMSC results in routing of the call to IMS using the IMRN. Two methods can then be used to ensure correlation between the IMRN and the original called party.*

*a Cooperative allocation/deallocation: In this method, the IMS is made aware of the assigned IMRN and when a call is received for that number, the original number is retrieved. This method is similar to the Provide Roaming Number procedure in MAP (see TS 29.002).*

*b Algorithmic: In this method, a known algorithm is used to derive the IMRN at the CS [i.e. in the CS network], and to deduce the original called number from the IMRN at the IMS. One method of performing such an algorithm could be use of a prefix.*

MAP is short for the Signaling System 7 protocol Mobile Application Part. HSS-directed call diversion to IMS is based on a non-standardized mechanism used to configure the user profile in the HSS to return an IMRN to the GMSC in response to the SRI query. It also requires specific routing data configuration to handle the routing to IMS using the IMRN. Sub-option a. requires that the IMS is made aware of the IMRN and is able to replace the IMRN with the original called number when the call reaches the IMS, but it no procedures to handle this are described.

3. Static Diversion from GMSC with Dedicated Trunk Groups

*This option also applies to configurations requiring handling of incoming calls at the GMSC function. Dedicated trunk groups can be used at the GMSC to divert CS terminations to the MGCF.*

The drawback with this procedure is that it requires dedicated trunk groups to be configured and managed.

4. Static Diversion Using Local Number Portability

*This option can be used for routing of calls originating in PSTN networks to IMS. A Local Number Portability database dip can be used to reroute incoming calls to a subscriber with a service provided by the IMS with calls to the MGCF.*

In the extract above PSTN stands for Public Switched Telephone Network. The drawback with this procedure is that it requires porting procedures to be used when enabling ICS for a subscriber, which may impact on the operator's Business Support System and incur interruption in service delivery to the user.

5. Direct Routing to IMS

*Translations can be set up in the PSTN network to route the incoming call to a subscriber with a service provided by the IMS to the MGCF. This way the normal IMS routing technique specified in TS 23.228 can be used.*

The drawback with this procedure is that it requires specific number series to be used for ICS subscribers.

SUMMARY

In a first aspect, the invention provides a method of routing a call involving an ICS subscriber accessing an IMS network via a CS access network. The method includes receiving an incoming call request for a user at a GMSC. A Location Register storing information relating to the user is accessed to ascertain whether the user is an ICS subscriber. On ascertaining that the user is an ICS subscriber, a SIP INVITE message is generated and forwarded to the IMS to establish the call.

In some embodiments the GMSC is integral with a V-MSC, serving the user, and accessing the Location Register comprises checking a VLR of the V-MSC to determine if an ICS indicator indicating that the user is an ICS subscriber has been provided for the user. Alternatively, or additionally, accessing the Location Register may comprise checking the VLR of the V-MSC to determine if the user has registered with the IMS.

Accessing the Location Register may comprise sending a request for routing information to be provided by the user's HLR and sending a response to the GMSC, which includes an ICS indicator indicating that the user is an ICS subscriber.

Embodiments may further comprise converting a destination number in the incoming call request into a global format for inclusion in a Request URI of the SIP INVITE. The converted destination number may be included either as a tel URI or as a tel URI embedded within a SIP URI.

In some embodiments, the GMSC is enhanced for ICS, and generates and forwards the SIP INVITE to the IMS.

In some embodiments, where the request for routing information is sent to the user's HLR, the response sent to the GMSC includes both the ICS indicator and an IP Multimedia Routing Number, IMRN. If the GMSC is not enhanced for ICS, on receiving the response, the GMSC routes the call using the IMRN. Alternatively, on receiving the ICS indicator in the response, the GMSC routes the call via a trunk to a Media Gateway Control Function, MGCF, connected to the IMS.

The ICS indicator may be stored with the subscriber's profile data in the subscriber's HLR. The subscriber's HLR may be part of the subscriber's Home Subscriber Server, HSS, the request for routing information being sent to the HSS.

It is an advantage that because the GMSC determines that the user is an ICS subscriber, the T-SDS routing from CS to IMS is greatly simplified. Hence, there is no need for the HLR to provide an IMRN in the response to the SRI query. There is no requirement for any additional CAMEL triggering, or for any new/non-standardized subscriber data as the already standardized ICS indicator can be used. There is no requirement for any dedicated trunk groups, or for use of number portability mechanisms, or for a dedicated number series to be allocated to ICS users.

In another aspect, the invention provides a GMSC in a telecommunications network. On receiving an incoming call request for a user requesting services provided by an IMS network, the GMSC accesses a Location Register storing information relating to the user, to ascertain whether the user is an ICS, subscriber. On ascertaining that the user is an ICS subscriber, the GMSC initiates generation of a SIP INVITE message to be forwarded to the IMS network to establish the call.

The GMSC may be integral with a V-MSC serving the user, and configured to access a VLR, of the V-MSC to determine if an ICS indicator indicating that the user is an ICS subscriber has been provided for the user. The GMSC may be configured to access the VLR of the V-MSC to determine if the user has registered with the IMS. The GMSC may be configured to send a request for routing information to the user's HLR, wherein a response to the request that includes an ICS indicator indicating that the user is an ICS subscriber. The GMSC may be further configured to generate and send the SIP INVITE message to the IMS. Alternatively, the GMSC may be configured to use the ICS indicator as a trunk selector and to route the call via a trunk to a MGCF connected to the IMS. The MGCF may be an internal component of the GMSC.

In another aspect the invention provides a HLR in a telecommunications network. On receiving a request from a GMSC to provide routing information for an incoming call request for a user, the HLR is configured to ascertain whether the user is an ICS subscriber. On ascertaining that the user is an ICS subscriber, the HLR includes an indicator of that in a response to the GMSC. The HLR may be further configured to provide an IMRN in the response to the GMSC.

DETAILED DESCRIPTION

Figure 1:
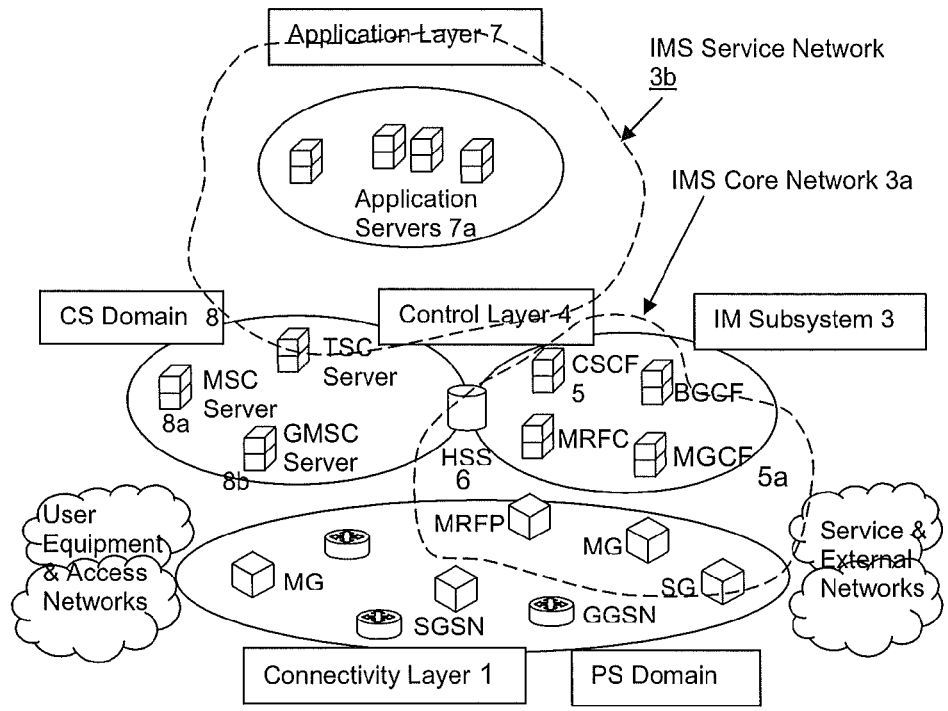
FIG. 1 illustrates schematically in a block diagram an IP Multimedia Subsystem network.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items and may be abbreviated as "/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block may be separated into multiple blocks and/or the functionality of two or more blocks may be at least partially integrated.

Figure 3A:
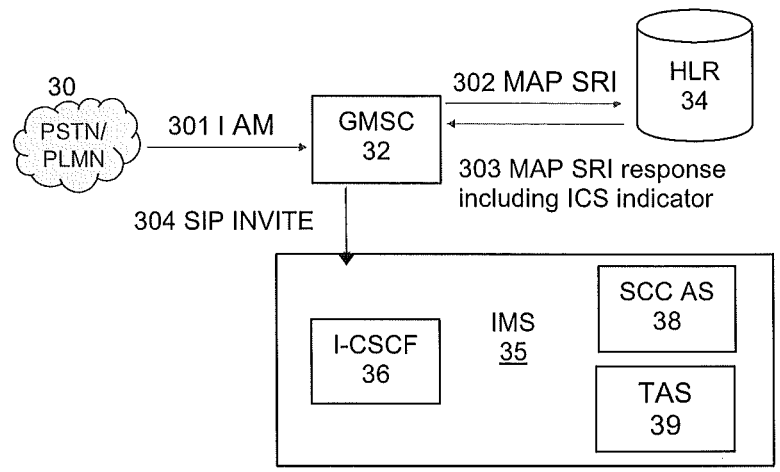
FIG. 3 illustrates schematically in a block diagram the signalling for implementing a procedure for routing an ICS call/session.

Referring first to FIG. 3a, in one embodiment, a call set-up request 301 is received at a GMSC 32 from an ICS user in a CS network 30 such as a public switched telephone network (PSTN) or a public land mobile network (PLMN). Upon receipt of the incoming call, the GMSC 32 sends a MAP SRI 302 to the user's HLR 34. This is a request for the HLR 34 to provide routing information using the MAP Send Routing Information (SRI) procedure (as defined in 3GPP TS 29.002). The MAP SRI 302 may be directed to the HLR 34 via the user's HSS (not shown), for example if the HLR 34 is co-located or integrated with the HSS. The user profile in the HLR 34 is provisioned with an ICS indicator indicating that the subscriber is an ICS user (as specified in 3GPP TS 23,008). Currently this is specified for the purposes of registration. When an ICS user attaches to a V-MSC the V-MSC sends a MAP_UPDATE_LOCATION request to the user's HLR and receives the ICS indicator from the HLR in a MAP Insert Subscriber Data message (see 3GPP TS 29.002). The V-MSC, which is enhanced for ICS, then performs registration in the IMS on behalf of the user via the I2 interface.

Figure 2:
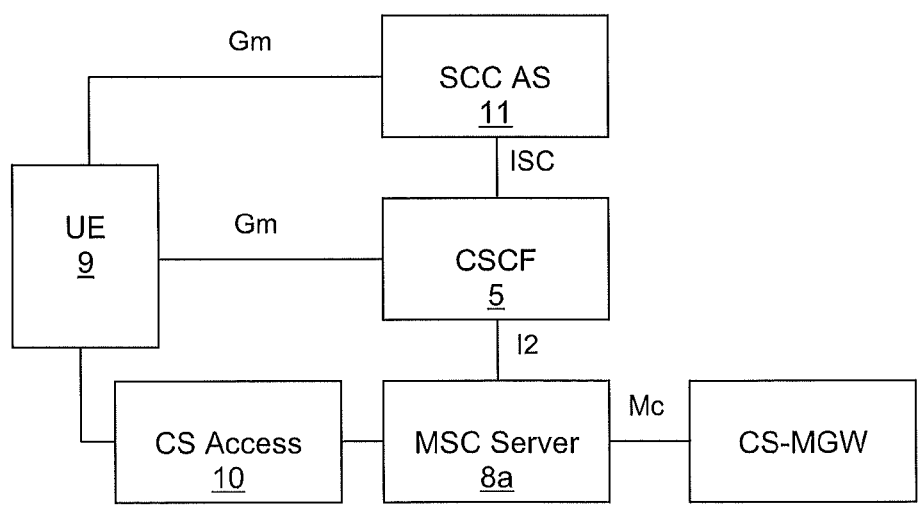
FIG. 2 illustrates schematically in a block diagram an IMS Centralized Services network.

In the present situation, the HLR 34 on receiving the MAP SRI 302 from the GMSC 32 is configured to return a MAP SRI response 303 to the GMSC 32. The response now includes the ICS indicator, indicating to the GMSC that the user is an ICS subscriber. The GMSC is configured to recognise the ICS indicator, and to generate a SIP INVITE 304, which is forwarded to the IMS 35 to establish a terminating call leg. The SIP INVITE 304 can be routed via the I2 interface (see FIG. 2).

Figure 3B:
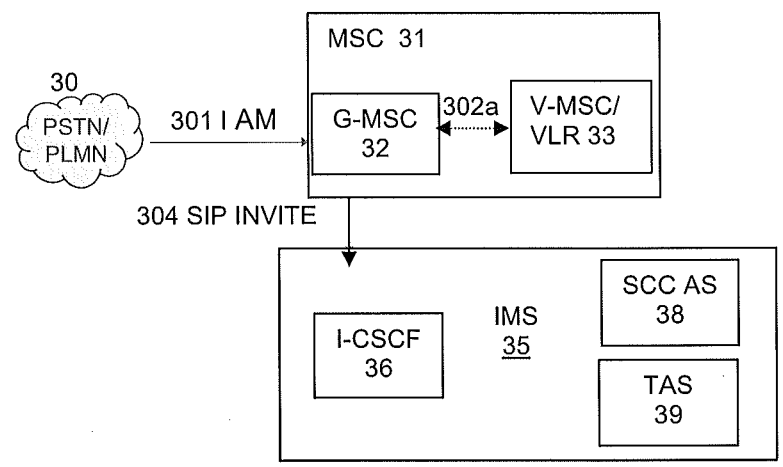

Another embodiment is shown in FIG. 3b, where equivalent features have the same reference numerals as FIG. 3a. Here the incoming call, IAM 301, is received at the GMSC 32, which is part of an MSC 31 that also includes the V-MSC and VLR 33 that was used when the user attached and registered. In this case, the GMSC 32 does not need to send a request to the user's HLR, because the ICS indicator would already have been provided to the MSC 31, when acting as the V-MSC and stored in the V-MSC/VLR 33. So instead, the GMSC 32 can ascertain that the user is an ICS user from the ICS indicator stored in the VLR. Thus, when the GMSC 32 receives the IAM 301 it checks if it is also the V-MSC for the called user and if it is, it performs a check 302a to see if the VLR data contains the ICS indicator. If that is the case the GMSC 32 skips the SRI steps 302 and 303 shown in FIG. 3a and proceeds directly to generate and send the SIP INVITE 304 routed to the IMS 35 (assuming it is an ICS-enabled GMSC). Because use of the ICS indicator in the registration procedure is not mandated, alternatively, or additionally, the GMSC 32 could use the check 302a to see whether the V-MSC 33 has an IMS registration for the user, and use this as a basis for the decision to generate the SIP INVITE 304 routed to the IMS 35.

FIG. 3a illustrates an embodiment in which the GMSC 32 ascertains that the served user is an ICS subscriber by querying the user's HLR 34, whereas FIG. 3B illustrates an embodiment in which the GMSC 32 queries the VLR of the V-MSC of the user to ascertain that the user is an ICS subscriber. Accordingly, the GMSC 32 may be configured to query any Location Register that would have the information it needs. Note, however, that in general the embodiment of FIG. 3b would need to be implemented in combination with that of FIG. 3a so that the GMSC 32 would only query the VLR in the situation where the GMSC 32 and V-MSC/VLR 33 are part of the same MSC 31, but would otherwise send the query to the HLR 34. This is because calls may arrive even when the user is not attached (or, for example, the user's cell phone is switched off). Also, being a mobile system the user can attach to V-MSCs other than his "at home" MSC.

The GMSC 32 determining, when it receives an incoming call request, that the user is an ICS user greatly simplifies the T-SDS routing from CS to IMS. Hence, there is no need for the HLR to provide an IMRN in the response to the SRI query. There is no requirement for CAMEL triggering (as in procedure 1 above). There is no requirement for any new/non-standardized subscriber data (as in procedure 2 above), instead use is made of the already standardized ICS indicator. There is no requirement for any dedicated trunk groups (as in procedure 3 above), for use of number portability mechanisms (as in procedure 4 above), or for a dedicated number series to be allocated to ICS users (as in procedure 5 above).

The incoming call request 301 will include a destination number (i.e. number of the served user). When generating the SIP INVITE 304, the destination number is converted to a global format and included in the Request-URI either as a tel URI or as a tel URI embedded within a SIP URI, in which case the domain name used is the same as 3GPP TS 24.292 specifies that an MSC enhanced for ICS should for registration, i.e. the home network domain name of the served user as defined in 3GPP TS 23.003.

In an optional alternative embodiment, the HLR may return both an IMRN (as in procedure 2 above) and the ICS indicator. Depending on the capabilities of the GMSC 32, it could either recognise the ICS indicator to generate a SIP INVITE as described above or, if it did not have the ICS-enhanced capabilities, could act on the IMRN (e.g. as described in procedure 1 or procedure 2 above).

In another alternative embodiment, where the GMSC 32 is not enhanced for ICS, on receiving the ICS indicator in the MAP SRI response 303, the GMSC 32 uses this as a trunk selector and routes the call via a trunk to an MGCF connected to IMS. 3GPP TS 24.292 states that if the MSC Server is not enhanced for ICS, interworking between the CS domain and the IMS is provided by an MGCF in accordance with 3GPP TS 29.163. This MGCF may be an internal component of the GMSC 32, and so would be configured to generate the SIP INVITE 304 itself.

Figure 4:
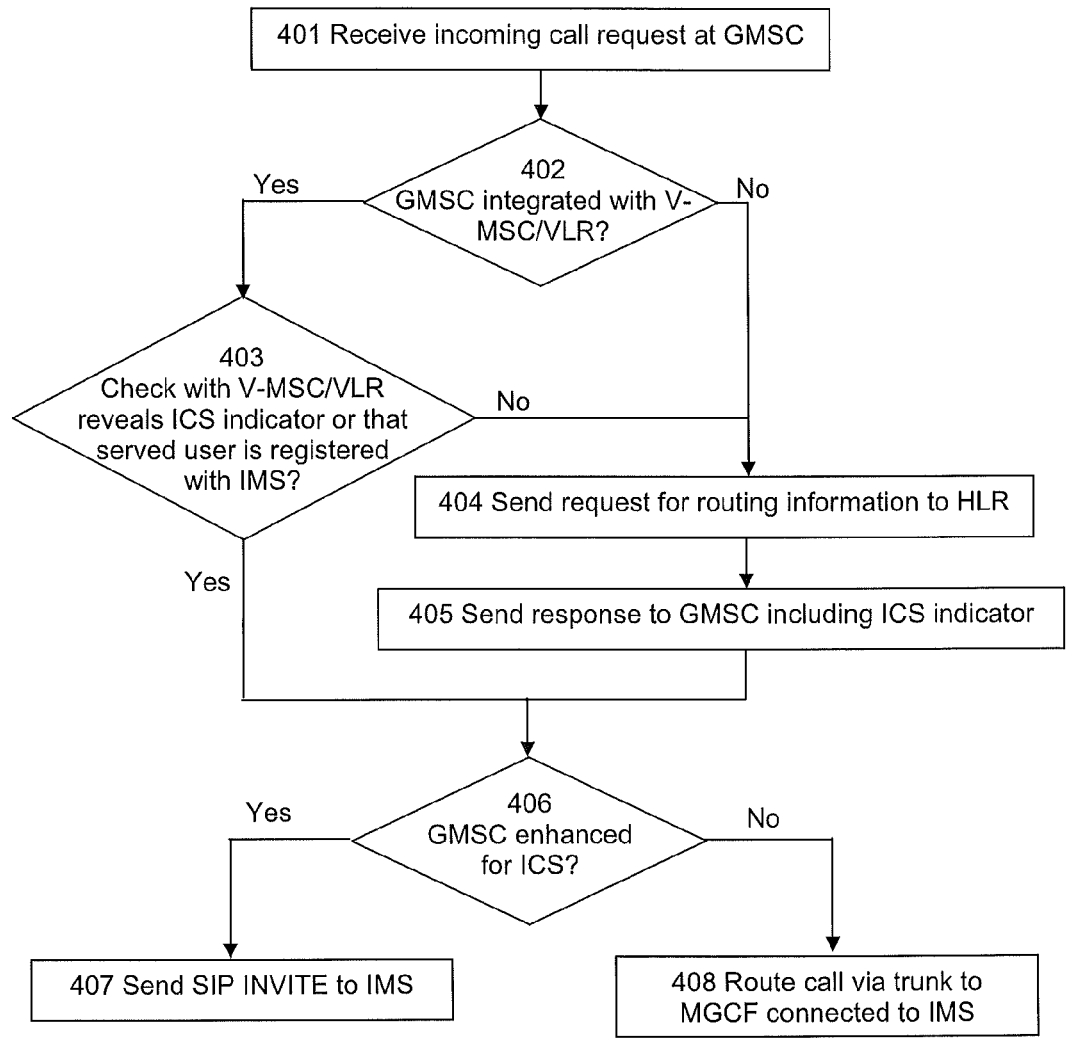
FIG. 4 is a flow diagram illustrating the method steps used in a procedure for routing an ICS call/session.

Referring now to FIG. 4, the flow chart illustrates an embodiment of the procedure combining that shown in FIGS. 3a and 3b. At step 401 an incoming call is received at the GMSC. At step 402, if the GMSC is part of an MSC that is integral with the V-MSC of the served user, then at step 403 the GMSC checks with the VLR to see if there is an ICS indicator, or if the user registered with the IMS. If at step 402 or 403 the answer is No, then at step 404 the GMSC sends a request (e.g. MAP SRI) requesting routing information from the user's HLR. At step 405 the HLR sends a response to the GMSC, including the ICS indicator. If at steps 402 and 403, the answers are Yes, or when the GMSC receives the response with the ICS indicator from the HLR at step 405, then at step 406, if the GMSC is enhanced for ICS, it proceeds to step 407, and generates and sends a SIP INVITE to the IMS to establish the call leg. If at step 406 the GMSC is not enhanced for ICS, then, in this embodiment, it proceeds to step 408 where it routes the call via trunk to an MGCF that is connected to the IMS.

That which is claimed is:

1. A method of routing a call involving an Internet Protocol (IP) Multimedia Subsystem Centralized Services (ICS) subscriber accessing an IP Multimedia Subsystem (IMS) network using a circuit switched (CS) access network, the method comprising:
   receiving an incoming call request for a user at a gateway Mobile Switching Centre (GMSC);
   accessing a Location Register storing information relating to the user to determine if the user is an ICS subscriber;
   determining that the user is an ICS subscriber from the presence of an ICS indicator in the stored information; and
   at the GMSC, generating and forwarding a session initiation protocol (SIP) INVITE message to the IMS to establish the call, wherein the GMSC reroutes the call to the IMS network based on a home and visitor location registration of the ICS subscriber.

2. The method of claim 1:
   wherein the GMSC is integrated with a Visited Mobile Switching Centre (V-MSC) serving the user; and
   wherein accessing the Location Register comprises checking a Visitor Location Register (VLR) of the V-MSC to determine if an ICS indicator indicating that the user is an ICS subscriber has been provided for the user.

3. The method of claim 1:
   wherein the GMSC is integrated with a Visited Mobile Switching Centre (V-MSC) serving the user; and
   wherein accessing the Location Register comprises checking a Visitor Location Register (VLR) of the V-MSC to determine if the user has registered with the IMS.

4. The method of claim 1, wherein accessing the Location Register comprises:
   sending a request for routing information to be provided by a user's Home Location Register (HLR); and
   sending a response to the GMSC, the response including the ICS indicator indicating that the user is an ICS subscriber.

5. The method of claim 1, further comprising converting a destination number in the incoming call request into a global format for inclusion in a Request uniform resource indicator (URI) of the SIP INVITE.

6. The method of claim 5, wherein the converted destination number is one of a telephone URI (tel URI) and a tel URI embedded within a SIP URI.

7. The method claim 1:
   wherein the GMSC is enhanced for ICS.

8. The method of claim 4, wherein the sending to the GMSC comprising sending the response to the GMSC including both the ICS indicator and an IP Multimedia Routing Number (IMRN).

9. The method of claim 4, wherein the ICS indicator is stored with the ICS subscriber's profile data in the ICS subscriber's HLR.

10. The method of claim 4, wherein the ICS subscriber's HLR is part of the subscriber's Home Subscriber Server (HSS) and wherein the request for routing information is sent to the HSS.

11. A Gateway Mobile Switching Centre (GMSC) in a telecommunications network, the GMSC being configured to:
   receive an incoming call request for a user requesting services provided by an Internet Protocol (IP) Multimedia Subsystem (IMS) network;
   access a Location Register storing information relating to the user responsive to receiving the incoming call request;
   determine if a user is an IP Multimedia Subsystem Centralized Services (ICS) subscriber from the presence of an ICS indicator in the stored information; and
   upon ascertaining that the user is an ICS subscriber, generate and send a session initiation protocol (SIP) INVITE message to the IMS network to establish the call, wherein the GMSC reroutes the call to the IMS network based on a home and visitor location registration of the ICS subscriber.

12. The GMSC of claim 11:
   wherein the GMSC is integrated with a Visited Mobile Switching Centre (V-MSC) serving the user; and
   wherein the GMSC is further configured to access a Visitor Location Register (VLR) of the V-MSC to determine if an ICS indicator indicating that the user is an ICS subscriber has been provided for the user.

13. The GMSC of claim 11:
   wherein the GMSC is integrated with a Visited Mobile Switching Centre (V-MSC) serving the user; and
   wherein the GMSC is further configured to access a Visitor Location Register (VLR) of the V-MSC to determine if the user has registered with the IMS.

14. The GMSC of claim 11, wherein the GMSC is further configured to:
   send a request for routing information to a user's Home Location register (HLR), wherein a response to the request includes an ICS indicator indicating that the user is an ICS subscriber.

15. The GMSC of claim 12, wherein the GMSC is further configured to:
   use the ICS indicator as a trunk selector; and
   route the call using a trunk to a Media Gateway Control Function (MGCF) connected to the IMS.

16. The GMSC of claim 15, wherein the MGCF is an internal component of the GMSC.

17. A Home Location Register (HLR) in a telecommunications network, the HLR configured to:
   receive a request from a Gateway Mobile Switching Centre (GMSC);
   provide routing information for an incoming call request for a user responsive to the received request;
   determine if the user is an Internet Protocol (IP) Multimedia Subsystem Centralized Services (ICS) subscriber from the presence of an ICS indictor in the routing information; and
   upon determining that the user is an ICS subscriber, include an indicator of that in a response to the GMSC, wherein the GMSC reroutes the call to the IMS network based on a home and visitor location registration of the ICS subscriber.

18. The HLR of claim 17, wherein the HLR is further configured to provide an IP Multimedia Routing Number (IMRN) in the response to the received request at the GMSC.

* * * * *

UNITED STATES PATENT AND TRADEMARK OFFICE
CERTIFICATE OF CORRECTION

| | |
|---|---|
| PATENT NO. | : 8,908,665 B2 |
| APPLICATION NO. | : 13/158649 |
| DATED | : December 9, 2014 |
| INVENTOR(S) | : Alriksson |

Page 1 of 1

It is certified that error appears in the above-identified patent and that said Letters Patent is hereby corrected as shown below:

In the Specification

In Column 2, Line 50, delete "Server 9" and insert -- Server 8a --, therefor.

In Column 2, Line 59, delete "chain The" and insert -- chain. The --, therefor.

In Column 7, Line 41, delete "23,008)." and insert -- 23.008). --, therefor.

In the Claims

In Column 9, Line 66, in Claim 7, delete "method claim" and insert -- method of claim --, therefor.

Signed and Sealed this
Fourteenth Day of July, 2015

Michelle K. Lee
*Director of the United States Patent and Trademark Office*